US005467963A

United States Patent [19]

Crofts et al.

[11] Patent Number: 5,467,963

[45] Date of Patent: Nov. 21, 1995

[54] TWO-PIECE COLLET ADJUSTING NUT FOR A FUEL INJECTOR SOLENOID VALVE

[75] Inventors: John D. Crofts, Edinburgh; Rodney M. Shurman, Columbus; Gayle L. Wheeler, Deputy, all of Ind.

[73] Assignee: Cummins Engine Company, Inc., Columbus, Ind.

[21] Appl. No.: 227,126

[22] Filed: Apr. 13, 1994

[51] Int. Cl.[6] .................... F16K 31/06

[52] U.S. Cl. .................... 251/129.18; 251/129.19; 411/266; 411/433

[58] Field of Search .................... 251/129.18, 129.19, 251/84, 85, 86, 285, 356; 411/432, 433, 265, 266

[56] References Cited

U.S. PATENT DOCUMENTS

| | | | |
|---|---|---|---|
| Re. 32,997 | 7/1989 | Burt et al. | 251/129.19 X |
| 2,384,953 | 9/1945 | Miller | 411/266 X |
| 3,616,828 | 11/1971 | Jessmore | 411/433 X |
| 4,630,799 | 12/1986 | Nolan et al. | 251/129.18 |
| 4,750,704 | 6/1988 | Brundage | 251/129.18 |
| 4,890,964 | 1/1990 | Lindley et al. | 411/433 X |
| 4,905,960 | 3/1990 | Barnhart et al. | 251/129.18 |
| 5,029,807 | 7/1991 | Fuchs | 251/129.18 |
| 5,044,563 | 9/1991 | Mesenich | 251/129.18 |
| 5,092,365 | 3/1992 | Neff | 251/129.18 |
| 5,197,507 | 3/1993 | Miki et al. | 251/129.18 |
| 5,232,167 | 8/1993 | McCormick et al. | 251/129.18 |
| 5,377,395 | 1/1995 | Maier et al. | 411/433 X |

*Primary Examiner*—Stephen M. Hepperle
*Attorney, Agent, or Firm*—Sixbey, Friedman, Leedom & Ferguson

[57] ABSTRACT

A solenoid valve is disclosed including a valve housing having a central bore and a valve seat, a valve element movable between an open position allowing fluid to pass through said valve seat and a closed position in sealing engagement with said valve seat, a valve operator for moving the valve element between the open and closed positions including a reciprocating armature plunger member extending through the bore and an armature secured to the armature plunger, and the valve seat when the valve element is in its open position without creating a path of leakage when the valve element is in its closed position. The armature plunger includes a threaded-end portion which extends from the valve seat for receiving a valve assembly which is provided with a top portion forming a sealing face and a bottom portion having a central opening adapted to receive the threaded end portion of the armature plunger. The valve stroke and locking mechanism includes a two-piece collet adjusting nut assembly having a collet nut which threadingly engages the threaded end portion of armature plunger and a closed end acorn cap which is pressed onto the collet nut creating an interference fit between the collet nut and the threaded end portion of the armature plunger due to the radial pressure exerted by the acorn cap.

12 Claims, 5 Drawing Sheets

TWO-PIECE COLLET ADJUSTING NUT FOR A FUEL INJECTOR SOLENOID VALVE

TECHNICAL FIELD OF THE INVENTION

The present invention relates to fluid valves and more particularly, to a solenoid operated valve for an internal combustion engine having a two-piece adjusting and locking means at the threaded end portion of the elongated valve member to provide for simple and effective valve stroke adjustment.

BACKGROUND OF THE INVENTION

The use of solenoid operated two-way valves in internal combustion engines is well known in the art and, more particularly, valves of this type are known to be used to control the flow of fuel into a timing chamber of an electronically controlled unit injector to permit control of both the quantity and timing of fuel injected into the internal combustion engine.

U.S. Pat. No. 4,431,160 issued to Burt et al. discloses an electrically operated valve for use in unit injectors. The valve includes a cup shaped valve element universally mounted on a stem operator for movement between open and closed positions. A spring element biases the operator toward the valve open position. An armature mounted on the stem operator opposite the valve element is selectively attracted toward the stator of a solenoid to cause the valve element to move to its closed position whenever the solenoid coil is energized. Valves of the type disclosed in the '160 patent are required to operate at very high speed (fully opened and closed in approximately 2.5 milliseconds) and must operate to block fluid at very high pressure (25–30,000 psi). To achieve this very high speed, the cup shaped valve element must be arranged as close to the valve seat as possible while providing adequate flow volume capacity. Such requirements necessitate extremely accurate positioning of the valve element relative to its valve seal.

When closed, valves of the type disclosed in '160 patent must create a very tight seal and thus the valve element is mounted by a self-aligning assembly. To allow for the accurate adjustment noted above, the self-aligning assembly includes a nut threadingly engaged with the stem operator so as to properly position the valve element. The nut includes art upper spherically shaped surface which is in constant contact with a conically shaped lower surface of the cup shaped valve element. The axial spacing between the valve element and the valve seat defines the stroke length of the valve and it is critical that this spacing be maintained at a predetermined optimum value. Fluctuation in this spacing of as little as 0.002 inches can affect the metering and timing of the injector and may eventually result in unacceptable performance of the injector, necessitating expensive repair. This fluctuation arises due to repeated impacts caused by reciprocation of the valve element between its open and closed positions. Therefore, it is essential that the nut, which retains the cup-shaped valve element of the valve, has a high retaining torque that does not degrade with time. In the above mentioned U.S. Pat. No. 4,431,160, it is the internal threads which are relied upon to act on the nut to hold the nut in place. This, however, has not been found to be reliable due to the above mentioned constant reciprocation of the cap and nut. During this constant reciprocation, the valve will vibrate, which, in turn, will cause the adjustment nut to slip or rotate, thereby deviating from the preset optimum position which may result in failure of the valve and costly repairs.

In an attempt to overcome the above noted shortcomings, U.S Pat. No. 4,905,960 issued to Barnhart et al. discloses a valve stroke adjustment locking mechanism comprising a valve seat having an axially extending bore therethrough and a seating surface, as shown in FIG. 6. A valve operator is provided having an elongated member which is reciprocable between a first open position and a second closed position. The elongated member includes a threaded end portion which extends from the valve seat for accommodating a valve assembly which is provided with a top portion forming a sealing face and a bottom portion having a central opening adapted to receive the threaded end portion of the elongated member. A closed end nut threadingly engages the threaded end portion of the elongated member and contacts the valve assembly for positioning the sealing surface at a predetermined spacing from the seating surface. A transverse hole is then electromechanically discharge machined transversely through the closed end nut and the threaded end portion of said piston member and a pressure fit pin is forced into the hole to rigidly fix the closed end nut relative to the elongated member in order to maintain the predetermined spacing without forming any paths of leakage.

FIG. 5 discloses a prior art adjusting nut design for an injector solenoid valve assembly. In this design, the closed end acorn nut threadingly engages the threaded end portion of an elongated member and is positioned at a predetermined spacing from the seating surface. The nut to plunger retention forces are generated by torque. Furthermore, a loctite process is used between the nut and plunger threads to fix the nut at its predetermined position. To accurately set the valve stroke, a selective assembly of valve components must be used. Testing of this design has shown adjusting nut :retaining torque to be a function of fluid pressure where retaining torque deterioration becomes more pronounced as fluid pressure is increased.

It is evident that there is a need for a simplified adjusting nut which will both accurately and reliably position a fluid valve closure element in a predetermined optimum position, and do so without resulting in any leakage of fluid from within the assembly. Furthermore, there is a need for an adjusting and locking mechanism which will provide for easier construction of a solenoid valve assembly resulting in a lower cost of manufacture.

SUMMARY OF THE INVENTION

In view of the foregoing, it is an object of the present invention to provide a solenoid valve assembly that has a simplified two-piece adjusting nut design allowing for easy valve stroke adjustments.

It is a further object of the present invention to provide an adjusting nut design where the retention forces are high enough to eliminate a loss of axial clamp load between the nut and plunger.

It is yet another object of the present invention to provide an adjusting nut having a retaining torque that does not degrade due to the repeated constriction of the nut from the exposure to injector timing chamber fuel pressure.

It is further an object of the present invention to provide a two-piece adjusting nut design that allows for the valve stroke to be adjusted before installing the cap resulting in a more accurate and reliable valve stroke setting.

These, as well as other objects of the present invention are achieved by a solenoid valve comprising a valve seat having an axially extending bore therethrough, and a seating surface. An armature plunger is extended through the axial bore and is reciprocal between first and second positions corresponding to the opened and closed positions of the valve. A valve element is provided which is movable between the opened position, allowing fluid to pass between the valve seat and the valve element and the closed position, sealing the valve element against the valve seat. The armature plunger is connected to the valve element to move this element between the opened and closed positions by way of a solenoid. In the present embodiment of the invention, the armature plunger includes a threaded end portion which extends from the valve seat for accommodating a two-piece collet adjusting nut. The first piece comprises a threaded collet nut with a spherical sealing surface on one end and a segmented collet on the other end. This collet nut threadingly engages the threaded end portion of the armature plunger and contacts the valve assembly for positioning the sealing surface at a predetermined spacing from the seating surface. The second piece comprises a closed end acorn cap portion that is pressed over the threaded end portion of the armature plunger and onto the segmented end of the collet nut creating an interference fit. The press fit cap causes the collet nut to lock on to the armature plunger threads and makes the segmented end of the collet nut pressure tight. The collet nut allows the armature plunger to travel to establish a valve stroke, by rotating the nut relative to the armature plunger threads, before the cap is pressure fitted. This design solves the problem of the loss of axial clamp load between the nut and the plunger by gripping the armature plunger threads radially as a result of pressing the cap onto the collet nut.

DETAILED DESCRIPTION OF PREFERRED EMBODIMENTS

Figure 1:
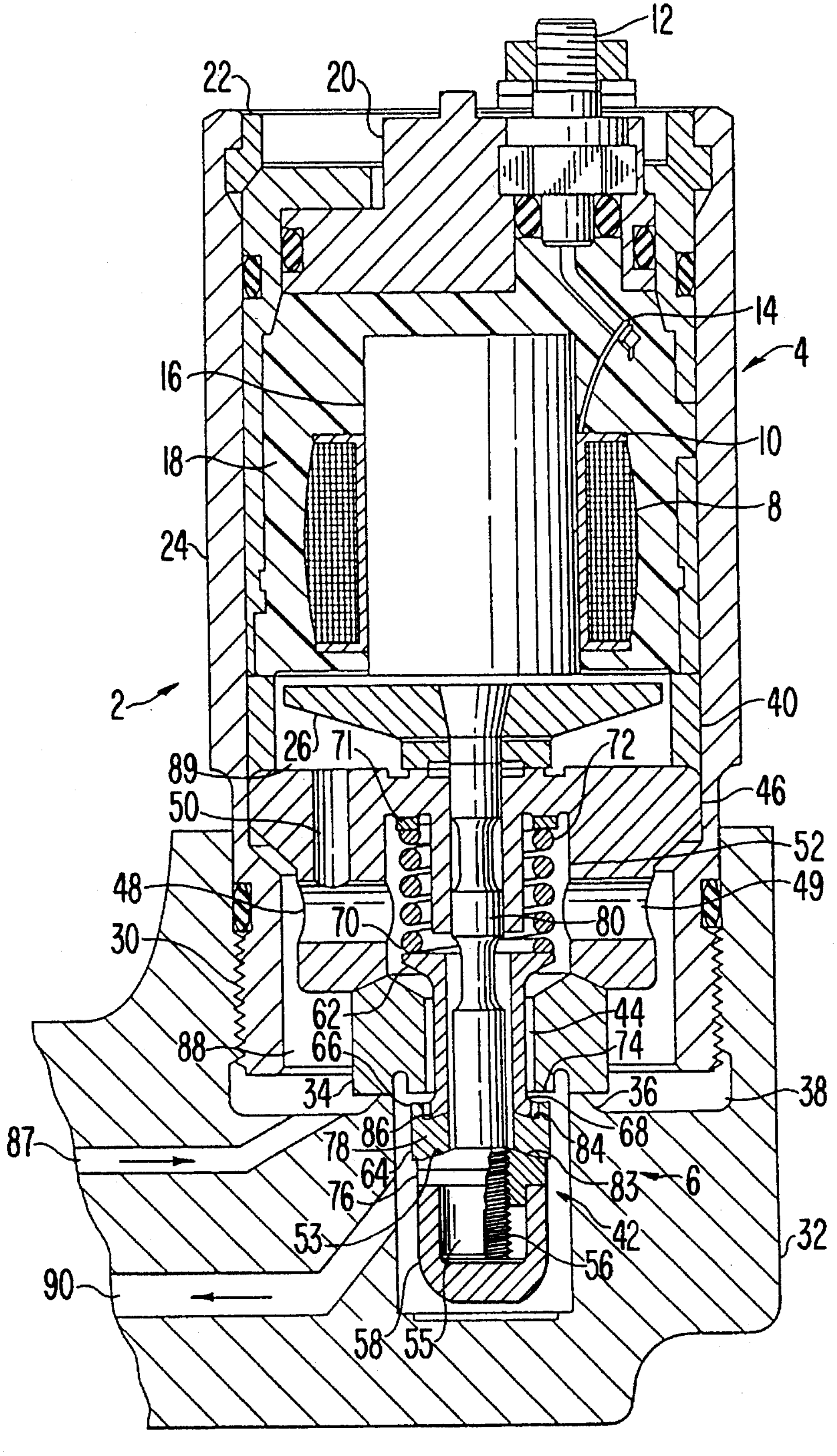
FIG. 1 is a cross-sectional elevational view of the injector assembly in the open condition in accordance with a preferred embodiment of the present invention.

FIG. 1 of the drawings illustrates a solenoid operated valve 2 formed of generally two sections. The first being a stator 4 illustrated in the upper section of FIG. 1 and the other being a mechanical valve assembly 6, shown in the lower section of FIG. 1 and independently in FIGS. 2 and 3. The stator 4 is of the conventional form set forth above in the prior art and therefore will be only discussed briefly herein. The stator 4 includes a coil 8 encircling a spool 10. Electrical energization of coil 8 is supplied through element 12 and line 14 to the coil 8. The spool 10 circumscribes a laminate core 16 and is encased in an epoxy packing 18. Element 12 is secured within the plate 20 and securing ring 22 further secures the entire assembly within the housing 24.

Figure 2:
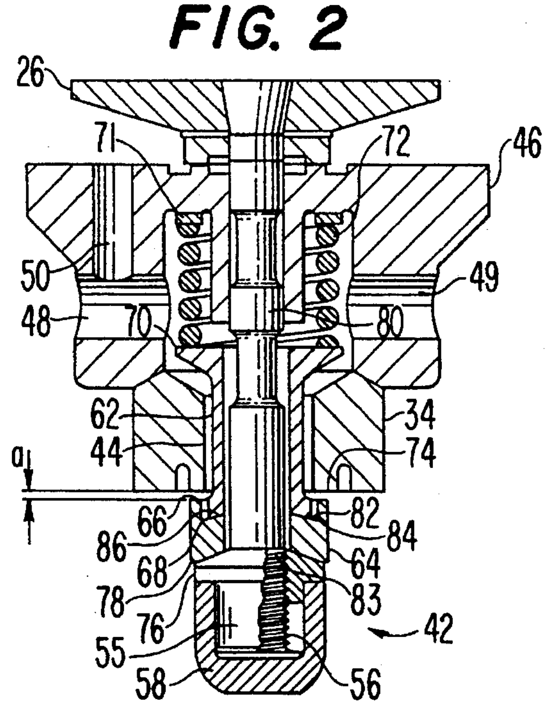
FIG. 2 is a cross-sectional elevational view of the valve portion of the injector assembly in the opened condition in accordance with the preferred embodiment of the present invention.
Figure 3:
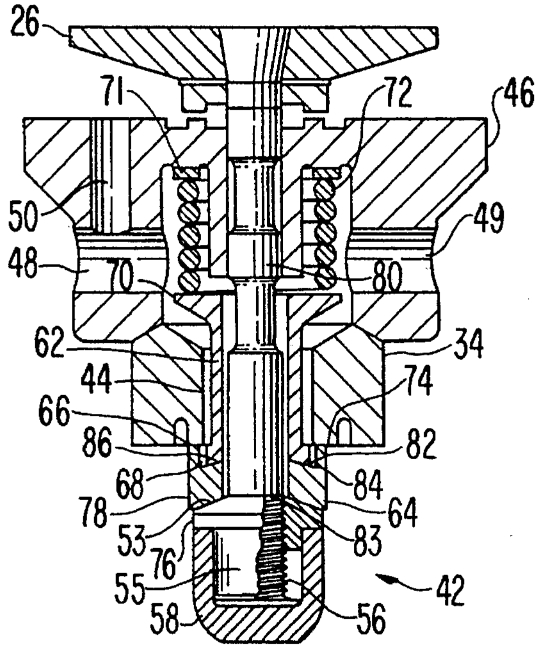
FIG. 3 is a cross-sectional elevational view of the valve portion of the injector assembly in the closed condition in accordance with the preferred embodiment of the present invention.

In operation, energization of the coil 8 creates a magnetic field which attracts an armature 26 of the mechanical valve assembly 6 to selectively move the valve from an opened condition shown in FIG. 2, to a closed condition shown in FIG. 3.

The housing 24 includes a threaded end portion 30 which is threadingly received within the injection apparatus 32. The threaded end portion 30 of the housing 24 accommodates the mechanical valve assembly 6. When the housing 24 is inserted within the injection apparatus 32, a valve seat 34 of the mechanical valve assembly 6 abuts an annular ridge 36 provided in a receiving bore 38 of the injection apparatus 32. In doing so, the mechanical valve assembly 6 is forced against spacer 40 which maintains the armature 26 spaced from the stator 4.

The mechanical valve 6 embodies an important feature of the subject invention, namely an adjustment and locking mechanism 42. The mechanical valve 6 includes the previously mentioned valve seat 34 having an axial bore 44 extending therethrough. An armature housing 79 is provided between the valve seat 34 and the spacer 40. This armature housing 79 includes flow passages 48, 49, and 50 and has an axial bore 52 extending coaxially with the axial bore 44. Each of the bores 44 and 52 receive a stem operator in the form of an armature plunger 80 therein which is attached at one end to the armature 26 and is provided at its other end with a threaded extending portion 56.

Figure 4A:
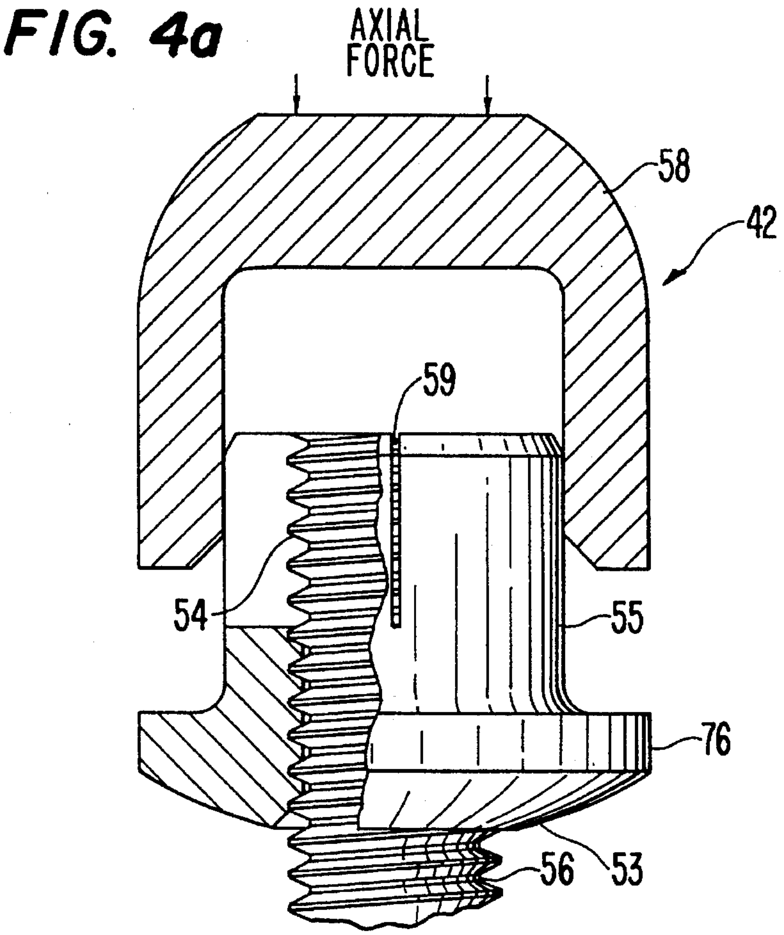
FIG. 4*a* is a cross-sectional view of the two-piece collet adjusting nut prior to pressing the cap onto the segmented end of the collet nut.
Figure 4B:
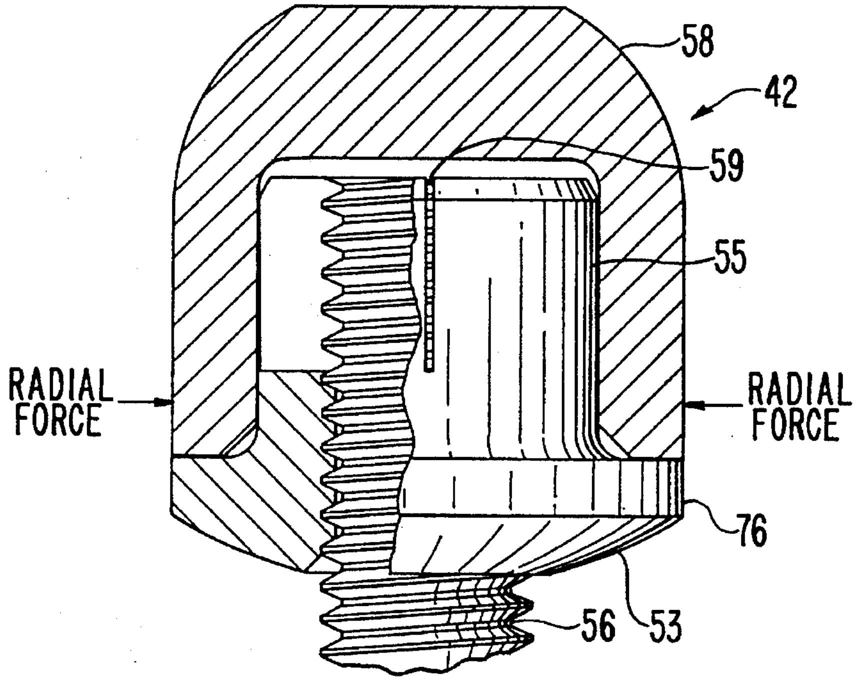
FIG. 4*b* is a cross-sectional view of the two-piece collet adjusting nut after pressing the cap onto the segmented end of the collet nut creating an interference fit.
Figure 4C:
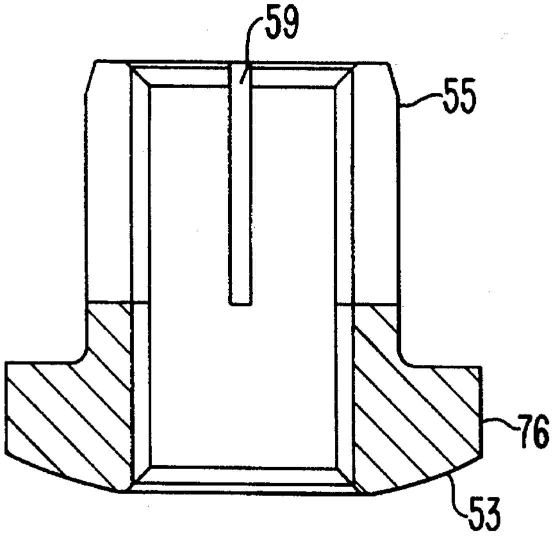
FIG. 4*c* is cross-sectional view of the collet nut portion of the two-piece collet adjusting nut.
Figure 4D:
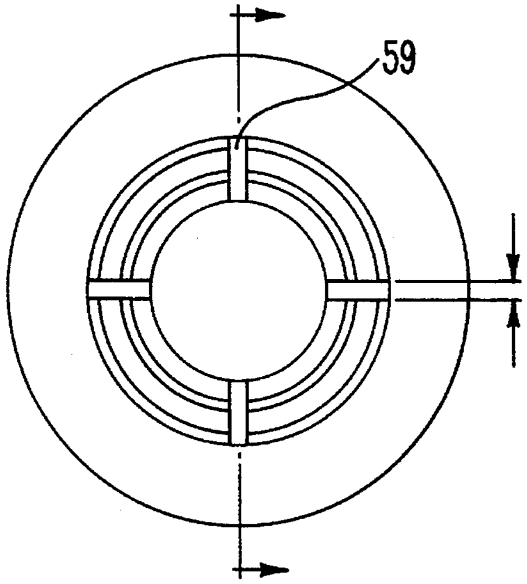
FIG. 4*d* is a top view of the collet nut portion of the two-piece collet adjusting nut.

The stroke adjustment and locking mechanism 42 shown in FIGS. 4*a* and 4*b* includes a threaded collet nut 76 with a spherical sealing surface 53 on one end and a segmented collet 55 on the other end. FIGS. 4*c* and 4*d* illustrate the segmented end 55 of the collet nut 76 which includes four slots 59 that are spaced 90 degrees from each other to form four equidistant finger segments 60 which extend vertically outward from the threaded collet body 76. Each finger segment 60 contains threads on its annular inner surface. This collet nut 76 threadingly engages the threaded end portion of the armature plunger 80 and contacts the bottom 78 of the cup-shaped cap 64 which has a conically shaped outer surface 83. The stroke adjustment and locking mechanism 42 further includes a closed end acorn cap 58 that is pressed over the threaded end portion of the armature plunger 56 and onto the segmented end 55 of the collet nut 76 creating an interference fit. The bottom inner surface of the closed end cap 58 abuts the entire outer surface area of the segmented end 55 of the threaded collet nut 76. The press-fit acorn cap 58 causes the collet nut 76 to lock on to the armature plunger threads 56 and makes the segmented end 55 of the nut pressure tight by providing a radial force against the finger segments 60 thereby pressing the threaded inner annular surface of each finger segment onto the complimentary threaded end portion of the armature plunger 56. A valve spring spacer 62 and an intermediately positioned hollow shaped valve disc 78 having an annular circumferential sealing face 66 are concentrically located about the armature plunger 80. An end 68 of the valve spring spacer 62 extends outwardly from the axial bore 44 of the valve seat 34, while the other end 70 of the valve spring spacer 62 extends within the axial bore 52 of the armature housing 79. A spring 72 is maintained in abutment with the end 70 of the valve spring spacer 62 so as to resiliently bias the valve in the opened condition, as shown in FIG. 1 and FIG. 3. A spring shim 71 engages the spring 72 opposite the valve disc spacer 62 and sits within the axial bore 44 abutting the armature housing 79.

In order to ensure complete circumferential contact between the seating surface 73 of the valve seat 34 and the annular sealing face 66, the valve assembly 3 is provided with a self-aligning means. This self-aligning means is formed between the closed end acorn cap 58, the threaded collet nut 76, the cup-shaped valve disc 78, and the valve spring spacer 62. The cup-shaped valve disc 78 is rotatably and slidably positioned between the threaded collet nut 76 and the valve spring spacer 62. The bottom of the cup-shaped valve disc 78 is provided with a conically shaped outer surface 81 which insures a continuous line of contact between itself and the spherical surface 53 of the threaded collet nut 76, and an inner portion 82 of the bottom of the cup-shaped valve-disc 78 includes a contact surface 84 which forms a continuous line contact with the lower surface 86 of the valve disc spacer 62.

Referring now to the fuel flow within the mechanical valve assembly 6 in FIG. 1, a fuel supply line 87 supplies fuel to an accumulation chamber 88 within a lower portion of the housing 24. The fuel may then flow into the valve assembly through the flow passages 48 and 49. The flow passage 50 is provided between the flow passage 48 and the armature cavity 89 to neutralize the pressure therebetween so as to allow for the free movement of the armature 26. When the mechanical valve assembly 6 is in the opened condition as shown in FIG. 1 and FIG. 3, the fuel will be permitted to flow outward through the spacing provided between the valve seat 34 and the sealing face 66 and through the output line 90 to the timing chamber of the injection apparatus.

Figure 5:
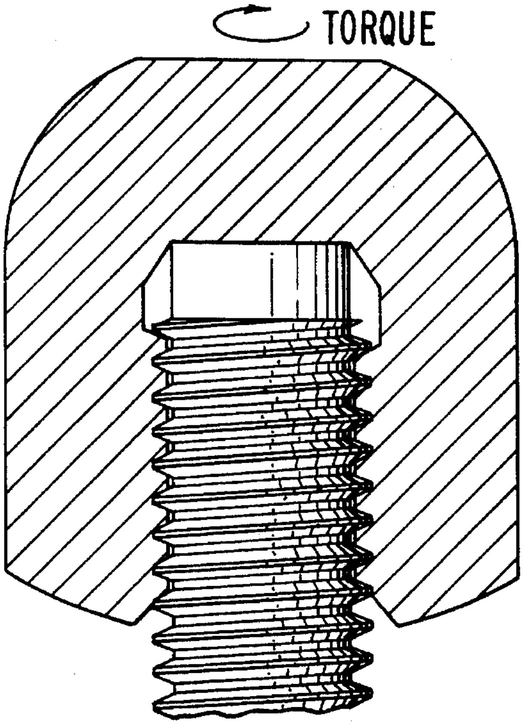
FIG. 5 (PRIOR ART)
FIG. 5 is a cross-sectional view of an adjusting nut assembly described as prior art.
Figure 6:
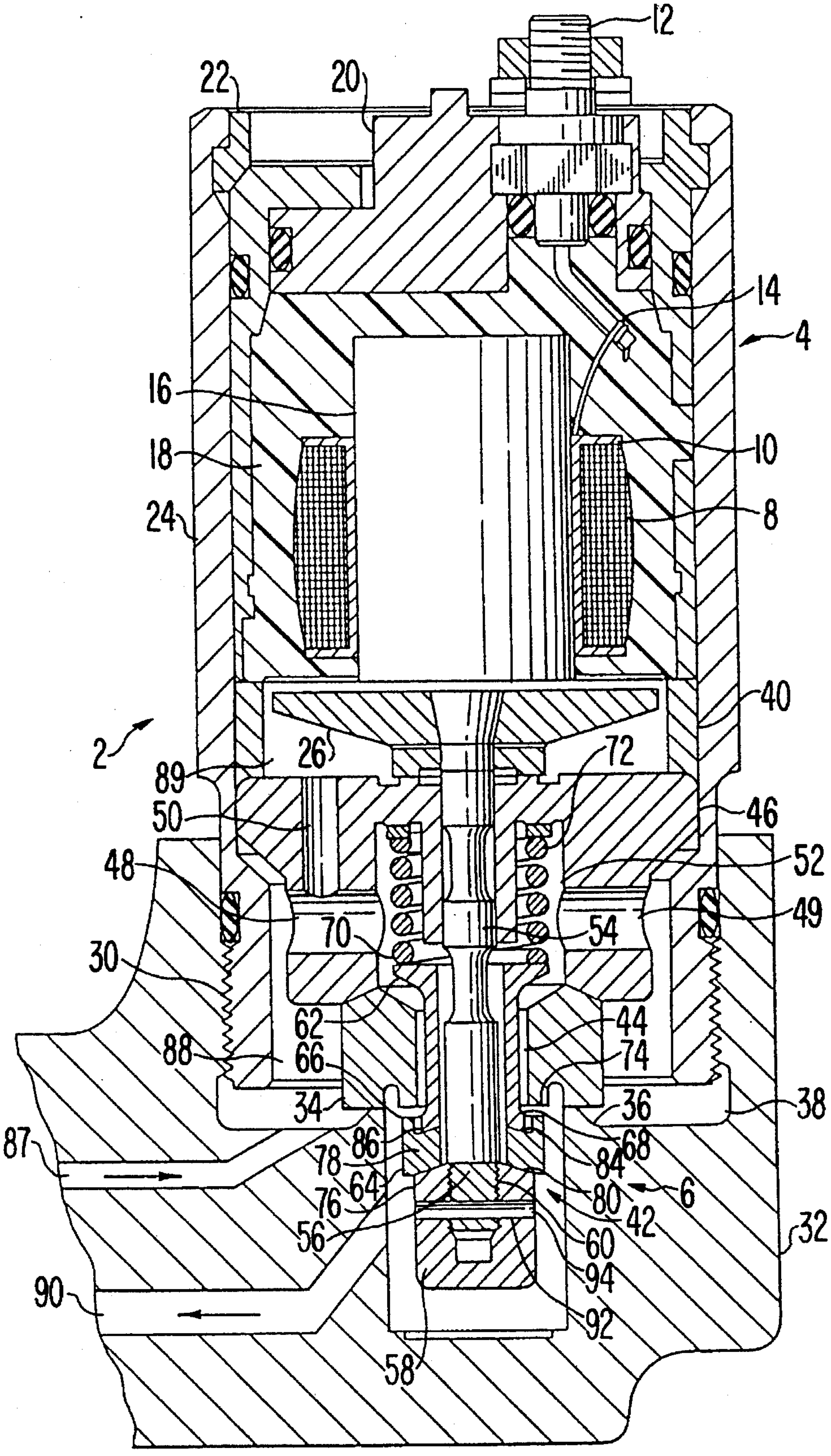
FIG. 6 (PRIOR ART)
FIG. 6 is a cross-sectional elevational view of an injector assembly described as prior art.

The spacing between the sealing face 66 and the valve seat 34 is designated by a dimension a shown in FIG. 3. This spacing is the predetermined valve stroke and is the critical dimension for the effective and efficient operation of the injector. A deviation from this predetermined valve stroke of as little as 0.002 inches affects the metering and timing of the injector, and a stroke shift in excess of this amount can eventually result in injector malfunction. It is this stroke length a in which the stroke adjustment and locking mechanism 42 is designed to maintain. The stroke length a is initially set by concentrically positioning the threaded collet nut 76 about the armature plunger threads 56 and threading the collet nut 76 onto the threaded end portion of the armature plunger 56 a sufficient distance to achieve the selected stroke length, as shown in FIG. 4*a*. Once this stroke length is set at its predetermined optimum value, the closed end acorn cap 58 is pressed onto the segmented end 55 of the collet nut 76, as shown in FIGS. 4*a* and 4*b*, creating an interference fit. The press fit acorn cap 58 causes the collet nut 76 to lock on to the armature plunger threads 56 and makes the segmented end 55 of the nut pressure tight. The threads of the collet nut 76 provide a radial gripping force against the armature plunger threads 56 under the pressure of the interference fit acorn cap 58, as shown in FIG. 4*b*. As a result of the radial pressure exerted by the acorn cap 58 on the collet nut 76, both flanks 54 of the collet nut 76 threads are fully engaged and the added cyclical fluid pressure of the injector operation does not cause relative motion between the collet nut 76 and armature plunger threads 56. This design results in high retention forces between the collet nut 76 and armature plunger 80 because a large axial force can be applied to assemble the closed-end shaped cap 58 onto the collet nut 76 since the force is transmitted through the mechanical valve assembly 6 rather than the armature plunger 80. This axial force allows for a large interference fit between the collet nut 76 and the closed-end acorn cap 58. Retaining torques above the plunger thread torsional strength are easily obtained. This two-piece collet nut design provides a retaining torque that does not degrade with time and the ability to adjust the valve stroke prior to completing the installation of the cap 58. Comparatively, other designs require selective assembly of valve components to achieve the correct stroke, as shown in FIG. 5. This stroke adjustment and locking mechanism permits no relative movement between the two-piece adjustable collet nut and the armature plunger 80 thus, accurately fixing and maintaining the set stroke length at the required predetermined optimum value. Consequently, the integrity of the injector valve performance will not be jeopardized by any change in valve stroke setting and no resulting leakage will occur.

While the invention has been described with reference to the preferred embodiment, it should be appreciated by those skilled in the art that the invention may be practiced otherwise than as specifically described herein without departing from the spirit and scope of the invention. It is therefore, understood that the spirit and scope of the invention be limited only by the appended claims.

INDUSTRIAL APPLICABILITY

The solenoid operated valve assembly may be employed in any environment where it is essential that an adjusting and locking mechanism not move the slightest amount relative to a reciprocating member to which it is applied. This particular adjusting and locking mechanism is even more appropriate with the existence of high pressures where the possibility of leakage is present. Application of this mechanism may be utilized in any environment where it is essential to regulate the flow of gas or a liquid from a source to a recipient.

What is claimed is:

1. A control valve comprising;

a valve housing having a central bore and a valve seat;

a valve element positioned in said housing and movable between an open position allowing fluid to pass through said valve seat and a closed position in sealing engagement with said valve seat;

a valve operation means for moving said valve element between said open and closed positions including a reciprocating armature plunger member extending through said central bore and an armature secured to said armature plunger;

a valve stroke adjustment means for adjustably mounting said valve element relative to said valve operation means for permitting adjustment to within an acceptable tolerance of a predetermined distance between said valve element and said valve seat when said valve element is in its open position without creating a path of leakage when said valve element is in its closed position, said valve stroke adjustment means including a nut positioned concentrically about a threaded end portion of said armature plunger for controlling the distance travelled by said armature relative to said valve operation means, said nut having a spherical sealing surface on one end and a segmented collet on the other end; and a locking means for radially securing said valve adjustment means for maintaining said predetermined distance between said valve element and said valve seat when said valve element is in its open position, said locking means including a cap contacting said segmented collet end of said nut to create an interference fit between said segmented collet and said armature plunger.

2. The control valve as defined in claim 1, wherein said valve operation means includes an electronically controlled solenoid.

3. The control valve as defined in claim 1, wherein said spherical sealing surface of said nut is positioned against the bottom of a cup-shaped valve disc to provide a continuous line of contact and a self-aligning means.

4. The control valve as defined in claim 3, wherein said cup-shaped valve disc is rotatably and slidably positioned between said nut and a valve spring spacer.

5. The control valve as defined in claim 1, wherein said cap is pressed over said threaded end portion of said armature plunger and onto said nut to provide a radial gripping force against the threads of said armature plunger.

6. The control valve as defined in claim 1, wherein said radial gripping force causes flanks of said nut to fully engage the threads of said armature plunger.

7. A valve stroke adjustment mechanism comprising;

a valve housing having a central bore and a valve seat;

a valve element positioned in said housing and movable between an open position allowing fluid to pass through said valve seat and a closed position in sealing engagement with said valve seat;

a valve operation means for moving said valve element between said open and closed positions including a reciprocating armature plunger member extending through said central bore and an armature secured to said armature plunger;

a valve stroke adjustment means for adjustably mounting said valve element relative to said valve operation means for permitting adjustment to within an acceptable tolerance of a predetermined distance between said valve element and said valve seat when said valve element is in its open position without creating a path of leakage when said valve element is in its closed position;

a locking nut which threadingly engages said armature plunger to set said valve element in a predetermined position with respect to said valve seat when said valve element is in the open position; and a cap which presses onto said nut to radially secure said nut against the threads of said armature plunger to prevent a change in the predetermined position of the valve element with respect to said valve seat when said valve element is in the open position.

8. The valve stroke adjustment mechanism as defined in claim 7, wherein said valve operation means includes an electronically controlled solenoid.

9. The valve stroke adjustment mechanism as defined in claim 7, where said nut is positioned concentrically about a threaded end portion of said armature plunger for setting the valve stroke of said valve element.

10. The valve stroke adjustment mechanism as defined in claim 8, wherein said nut includes a spherical sealing surface and a segmented collet end portion.

11. The valve stroke adjustment mechanism as defined in claim 8, wherein said cap is pressed onto said segmented collet end of said nut to create an interference fit between said segmented collet end and said threaded end portion of said armature plunger.

12. The valve stroke adjustment mechanism as defined in claim 9, wherein said cap pressed onto the said segmented collet end portion of said nut provides a radial gripping force against the threads of said armature plunger causing flanks of said nut to fully engage the threads of said armature plunger.

* * * * *